US010943126B2

(12) United States Patent
Guo et al.

(10) Patent No.: US 10,943,126 B2
(45) Date of Patent: Mar. 9, 2021

(54) METHOD AND APPARATUS FOR PROCESSING VIDEO STREAM

(71) Applicant: Advanced New Technologies Co., Ltd., Grand Cayman (KY)

(72) Inventors: Xin Guo, Hangzhou (CN); Yuan Cheng, Hangzhou (CN); Chen Jiang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/703,088

(22) Filed: Dec. 4, 2019

(65) Prior Publication Data

US 2020/0265239 A1 Aug. 20, 2020

(30) Foreign Application Priority Data

Feb. 14, 2019 (CN) .......................... 201910114910.5

(51) Int. Cl.
*G06K 9/00* (2006.01)
*G06T 7/269* (2017.01)
(Continued)

(52) U.S. Cl.
CPC ....... *G06K 9/00744* (2013.01); *G06K 9/6215* (2013.01); *G06T 7/0002* (2013.01);
(Continued)

(58) Field of Classification Search
CPC .. G06K 9/00744; G06K 9/6215; G06T 7/269; G06T 7/0002; G06T 2207/10016; G06T 2207/20084; G06T 2207/30248
See application file for complete search history.

(56) References Cited

U.S. PATENT DOCUMENTS

2016/0342843 A1* 11/2016 Yuan .................... G06K 9/4671
2017/0083770 A1* 3/2017 Carlson ............. G06K 9/00744
(Continued)

FOREIGN PATENT DOCUMENTS

CN 104036243 9/2014
CN 106980823 7/2017
(Continued)

OTHER PUBLICATIONS

Souza et al, "Sympathy for the Details: Dense Trajectories and Hybrid Classification Architectures for Action Recognition," in International Conference on Fianncial Crytography and Data Security, Sep. 16, 2020, 20 pages.
(Continued)

*Primary Examiner* — Xin Jia
(74) *Attorney, Agent, or Firm* — Fish & Richardson P.C.

(57) ABSTRACT

A video stream captured for an object is obtained. Features of S image frames in the video stream are extracted, and S N-dimensional feature vectors are generated. The S N-dimensional feature vectors are arranged in a chronological order corresponding to the order in which the image frames occur in the video stream to generate a feature matrix, wherein the feature matrix has N rows and at least S columns. The feature matrix is processed by using a pre-trained convolutional neural network, to obtain a processing result for the object captured in the video stream.

30 Claims, 5 Drawing Sheets

(51) Int. Cl.
*G06K 9/62* (2006.01)
*G06T 7/00* (2017.01)

(52) U.S. Cl.
CPC .... *G06T 7/269* (2017.01); *G06T 2207/10016* (2013.01); *G06T 2207/20084* (2013.01); *G06T 2207/30248* (2013.01)

(56) References Cited

U.S. PATENT DOCUMENTS

| | | | |
|---|---|---|---|
| 2017/0220854 A1* | 8/2017 | Yang | G06K 9/6288 |
| 2017/0308754 A1* | 10/2017 | Torabi | G06K 9/00671 |
| 2018/0253839 A1* | 9/2018 | Zur | G06T 7/0012 |
| 2019/0197350 A1* | 6/2019 | Park | G06T 7/73 |

FOREIGN PATENT DOCUMENTS

| | | |
|---|---|---|
| CN | 107194323 | 9/2017 |
| CN | 108960207 | 12/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

\* cited by examiner $C_0$  $C_1$  $C_2$  $C_3$ $X_{11}$  $X_{21}$  $X_{31}$  $X_{41}$  $X_{51}$  ○○○  $X_{s1}$ $X_{12}$  $X_{22}$  $X_{32}$  $X_{42}$  $X_{52}$  ○○○  $X_{s2}$ $X_{13}$  $X_{23}$  $X_{33}$  $X_{43}$  $X_{53}$  ○○○  $X_{s3}$

METHOD AND APPARATUS FOR PROCESSING VIDEO STREAM

CROSS-REFERENCE TO RELATED APPLICATIONS

This application claims priority to Chinese Patent Application No. 201910114910.5, filed on Feb. 14, 2019, which is hereby incorporated by reference in its entirety.

TECHNICAL FIELD

One or more implementations of the present specification relate to the field of computer technologies, and in particular, to a method and apparatus for processing video stream by using a computer.

BACKGROUND

Convolutional neural networks (CNNs) are a type of feedforward neural networks. Artificial neurons in the convolutional neural network can respond to peripheral units and can process large-size images. Convolutional neural networks usually use multi-frame image sequences as input, and can extract both space-dimensional abstract features and time-dimensional abstract features from the image sequences to dig out hidden image features. Convolutional neural networks play an important role in image sequence analysis fields such as video classification and motion identification. In common technologies, a method for analyzing a single image by using a convolutional neural network usually can dig out features of the single image in certain directions. In the video processing field, analysis is always performed on an individual image. Therefore, an improved solution is needed to utilize convolutional neural networks to provide more effective video stream processing.

SUMMARY

One or more implementations of the present specification describe a method and apparatus for processing a video stream, to alleviate some disadvantages in the existing technology.

According to a first aspect, a method for processing a video stream is provided, where the method includes the following: obtaining a video stream to be processed; extracting features of S image frames in the video stream, and generating S N-dimensional feature vectors; arranging the S N-dimensional feature vectors in a chronological order corresponding to the image frames, to generate a feature matrix, where the feature matrix has N rows and at least S columns; and processing the feature matrix by using a pre-trained convolutional neural network, to obtain a processing result of the video stream.

In some implementations, the S image frames include a first image frame, and the extracting features of S image frames in the video stream includes the following: determining a change feature of the first image frame based on a comparison between the first image frame and a previous image frame.

In some implementations, the S image frames include the first image frame, and the extracting features of S image frames in the video stream further includes the following: using an optical flow change from the previous image frame to the first image frame as the change feature.

In some implementations, the S image frames include the first image frame, and the extracting features of S image frames in the video stream further includes the following: determining, as the change feature of the first image frame, an SSIM index between the first image frame and the previous image frame that is determined by using a structural similarity model.

In some implementations, the S image frames include the first image frame, and the extracting features of S image frames in the video stream further includes the following: determining a projection matrix for converting the previous image frame into the first image frame; and using the projection matrix as the change feature.

In some implementations, when the first image frame is the 1st image frame in the video stream, the method further includes: determining that the change feature comprises a predetermined value, or determining that the previous image frame and the first image frame are a same image frame.

In some implementations, the extracting features of S image frames in the video stream includes the following: performing target identification on the first image frame in the S image frames, to determine a target feature of the first image frame.

In some implementations, the video stream is a video stream for a damaged vehicle, and the target feature includes one or more of a damaged part, a damaged material, and a damage category.

In some implementations, the extracting features of S image frames in the video stream includes the following: detecting one or more of the following items for the first image frame in the S image frames: whether fuzziness exists, whether a target is contained, whether illumination is sufficient, and whether a shooting angle is a predetermined angle, and using a detection result as a corresponding feature of the first image frame.

In some implementations, when a plurality of features are extracted from the first image frame in the S image frames, the generating S N-dimensional feature vectors includes the following: combining feature values corresponding to the plurality of features of the first image frame, to generate one N-dimensional feature vector.

In some implementations, the arranging the S N-dimensional feature vectors in a chronological order corresponding to the image frames to generate a feature matrix includes the following: supplementing M–S feature vectors to the S N-dimensional feature vectors by using an interpolation method, to generate a feature matrix with N rows and M columns.

In some implementations, for a first interpolation position, the interpolation method includes one of the following: using a feature vector nearest to the first interpolation position as a feature vector to be interpolated into the first interpolation position; and performing bilinear interpolation on elements corresponding to r feature vectors neighboring to the first interpolation position; and determining, based on an interpolation result, a feature vector to be interpolated into the first interpolation position.

In some implementations, the convolutional neural network performs convolution processing on the feature matrix by using at least one convolution kernel, where the convolution kernel sequentially processes a plurality of feature values of each time dimension in the feature matrix.

In some implementations, the convolutional neural network is used to extract a key image frame in the video stream, where the convolutional neural network is trained in the following way: obtaining a plurality of sample video streams, where each sample video stream corresponds to a corresponding sample feature matrix with N rows and at least S columns that is generated by extracting features from S image frames in the video stream; and obtaining a time period label that labels a position of a key frame, where the time period label includes a two-dimensional array used to describe a start moment and an end moment of a time period, where the start moment and the end moment are relative moments that are calculated starting from a 1st image frame of the video stream; and using all the sample feature matrices and time period labels to train the convolutional neural network so that a result of a loss prediction function of the trained model corresponding to the plurality of samples decreases compared to a result of a loss prediction function used before the training.

In further implementations, each element in the two-dimensional array is a ratio of a corresponding relative moment to a total time length of the video stream.

In some implementations, the convolutional neural network is used to make a vehicle handling decision on the video stream, where the convolutional neural network is trained in the following way: obtaining a plurality of sample video streams, where each sample video stream corresponds to a corresponding sample feature matrix with N rows and at least S columns that is generated by extracting features from S image frames in the video stream; and obtaining a handling decision label that corresponds to an actual vehicle; and using all the sample feature matrices and corresponding handling decision labels to train the convolutional neural network so that a result of a loss prediction function of the trained model corresponding to the plurality of samples decreases compared to a result of a loss prediction function used before the training.

In some implementations, the handling decision label is a multi-dimensional vector, and a plurality of elements in the handling decision label include renewal probability of each vehicle part and repair probability of each vehicle part.

According to a second aspect, an apparatus for processing a video stream is provided, where the apparatus includes the following: an acquisition unit, configured to obtain a video stream to be processed; a feature extraction unit, configured to extract features of S image frames in the video stream, and generate S N-dimensional feature vectors; a matrix generation unit, configured to arrange the S N-dimensional feature vectors in a chronological order corresponding to the image frames, to generate a feature matrix, where the feature matrix has N rows and at least S columns; and a convolution processing unit, configured to process the feature matrix by using a pre-trained convolutional neural network, to obtain a processing result of the video stream.

According to a third aspect, a computer-readable storage medium is provided, where the computer-readable storage medium stores a computer program, and when the computer program is run on a computer, the computer is enabled to perform the method according to the first aspect.

According to a fourth aspect, a computing device is provided, and includes a memory and a processor, where the memory stores executable code, and when the processor executes the executable code, the method according to the first aspect is implemented.

According to the method and apparatus for processing a video stream provided in the implementations of the present specification, a plurality of feature extraction models are deployed so that features are extracted from image frames in a video stream to obtain feature vectors of the image frames. Then, the feature vectors are combined to construct a feature matrix of a predetermined size specific to the video stream, and a pre-trained convolutional neural network model is innovatively used to process the feature matrix, to obtain a processing result of the video stream. The process can reduce model labeling complexity and can dig out feature correlation for time-domain video data through processing of a convolutional neural network, for more effective video processing.

BRIEF DESCRIPTION OF DRAWINGS

To describe the technical solutions in the implementations of the present disclosure more clearly, the following briefly introduces the accompanying drawings needed for describing the implementations. Apparently, the accompanying drawings in the following description show merely some implementations of the present disclosure, and a person of ordinary skill in the art can still derive other drawings from these accompanying drawings without creative efforts.

FIG. 3 is a schematic diagram illustrating feature matrix generation in a video stream processing process, according to an implementation;

DESCRIPTION OF IMPLEMENTATIONS

Figure 1:
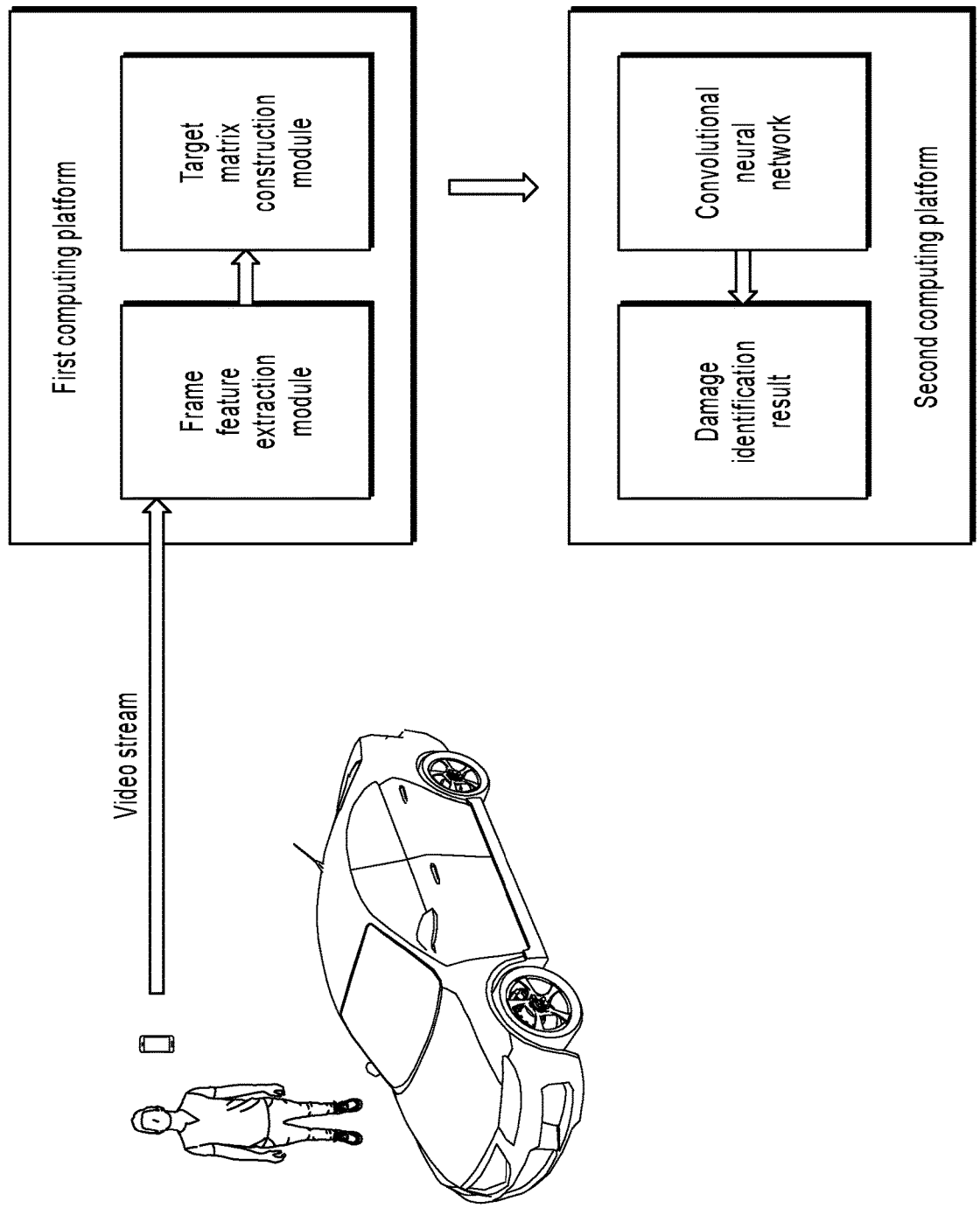
FIG. 1 is a schematic diagram illustrating an application scenario, according to an implementation of the present specification.

The following describes the solutions provided in the present specification with reference to accompanying drawings. For ease of description, a description is provided with reference to a specific applicable scenario in an implementation of the present specification illustrated in FIG. 1. FIG. 1 illustrates a specific scenario of vehicle damage identification.

Assuming that a vehicle is damaged in the implementation scenario, a user can collect scene information of the damaged vehicle by using an end-user device that can collect scene information, for example, a smartphone, a camera, and a sensor. The scene information can include a video stream. The video stream can be processed by a computing platform, to perform damage identification on the damaged vehicle. As shown in FIG. 1, the computing platform in the implementation scenario is composed of a first computing platform and a second computing platform.

Referring to FIG. 1, the first computing platform can first extract features from S image frames in the video stream by using an image frame feature extraction module, and generate one N-dimensional feature vector for each image frame. The S image frames here can include all image frames in the video stream, or can be image frames extracted at a predetermined time interval (for example, 500 ms). Subsequently, a feature matrix construction module can be used to arrange these N-dimensional feature vectors in a chronological order corresponding to the image frames, to generate a feature matrix. The feature matrix can include N rows and at least S columns. Next, the second computing platform can process the feature matrix by using a pre-trained convolutional neural network, to obtain a processing result of the video stream. In the scenario illustrated in FIG. 1, the processing result of the video stream can be a damage identification result of the damaged vehicle. In another application scenario, the processing result of the video stream can alternatively be a result of key image frame extraction, etc. No limitation is imposed here.

Notably, the convolutional neural network is a feedforward neural network. Neurons in the convolutional neural network can respond to peripheral units and can process large-size images. The convolutional neural network can include a one-dimensional convolutional neural network, a two-dimensional convolutional neural network, and a three-dimensional convolutional neural network. The one-dimensional convolutional neural network is usually applied to data processing of a sequence type. The two-dimensional convolutional neural network is usually applied to identification of texts of an image type. The three-dimensional convolutional neural network is usually applied to data identification of a medical image type and a video type. For image processing, different convolution kernels can be trained to dig out different image features. It can be seen that, the two-dimensional convolutional neural network and the three-dimensional convolutional neural network directly handle images during image or video data processing. If an image is considered as a matrix composed of a plurality of pixels, the convolutional neural network can analyze the matrix. Based on such an idea, in the technical framework in the present specification, the convolutional neural network is innovatively used to process the feature matrix composed of the feature vectors of the plurality of image frames so that associated features in consecutive images can be dug out.

It is easy to understand that: In one implementation, the first computing platform and the second computing platform can be one computing platform, for example, one computing platform of a serving end that is integrated on an end-user device or provides services for an application of a loss assessment type running on the end-user device. In another implementation, the first computing platform and the second computing platform are two separately disposed computing platforms, for example, the first computing platform is disposed on an end-user device, and is configured to pre-process a collected video stream, to obtain a feature matrix of the video stream, and the second computing platform is disposed at a serving end, and is configured to process the feature matrix by using a convolutional neural network, to provide a damage identification result of a damaged vehicle. Notably, the implementation scenario in FIG. 1 is an example. In another implementation, the feature matrix construction module can further be disposed on the second computing platform. No limitation is imposed in the present specification. In an optional implementation, the second computing platform can further return the damage identification result to the end-user device for demonstration.

It can be seen from the previous implementation scenario that, in the technical solutions provided in the present specification, the convolutional neural network that is generally used for image processing is innovatively used to process the feature matrix composed of the feature vectors of the plurality of image frames. The convolutional neural network is particularly applicable to an overall decision issue of a video stream, and can provide a more effective solution to video stream analysis.

The following describes in detail a specific process of a method for processing a video stream.

Figure 2:
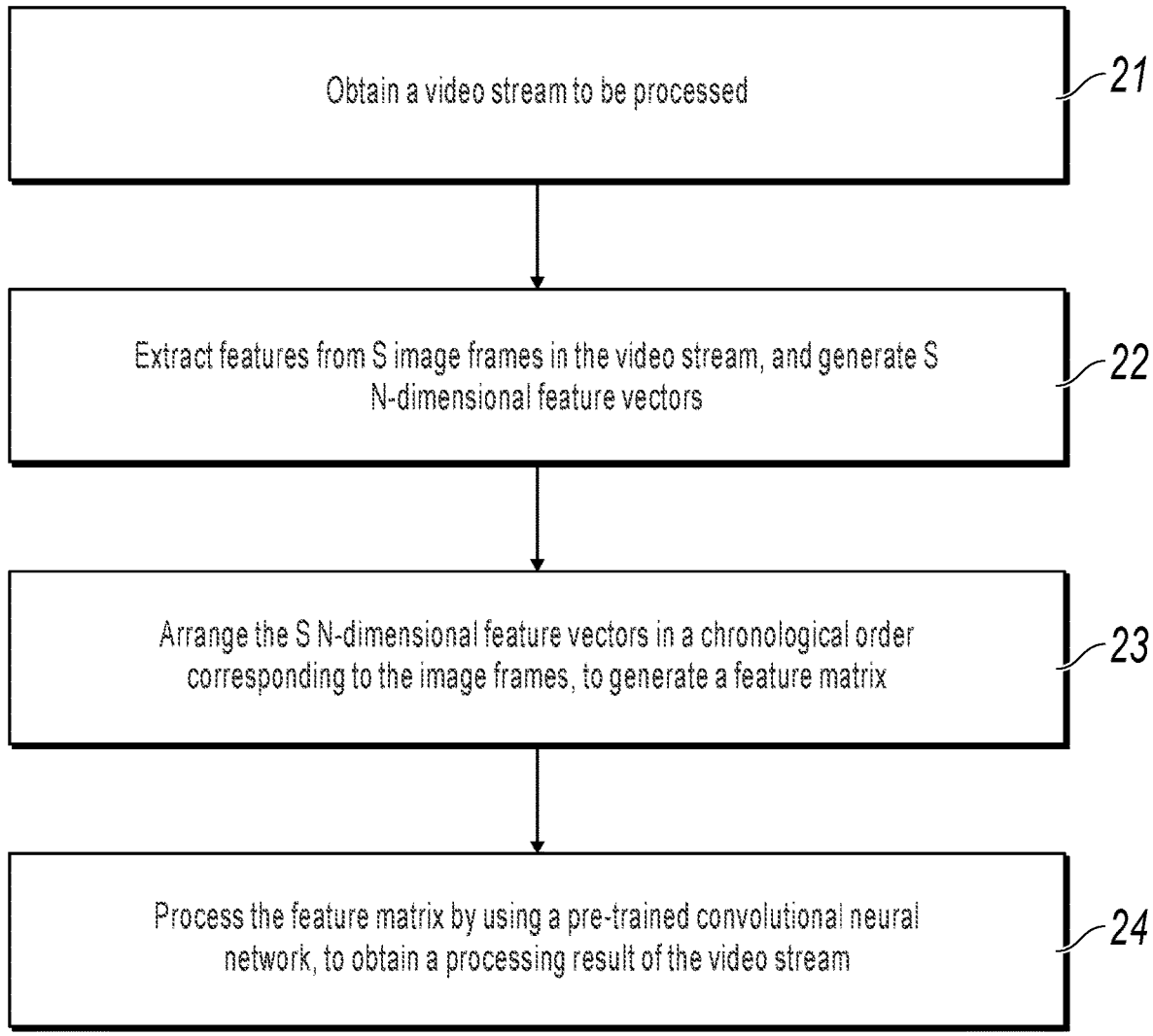
FIG. 2 is a flowchart illustrating a method for processing a video stream, according to an implementation.

FIG. 2 is a flowchart illustrating a method for processing a video stream, according to an implementation. An execution body of the method illustrated in FIG. 2 can be any system, end-user device, apparatus, platform, or server that has computing and processing capabilities and has a certain data processing capability, for example, an overall computing platform composed of the first computing platform and the second computing platform illustrated in FIG. 1.

As shown in FIG. 2, the method for processing a video stream includes the following steps: step 21: obtaining a video stream to be processed; step 22: extracting features of S image frames in the video stream, and generating S N-dimensional feature vectors; step 23: arranging the S N-dimensional feature vectors in a chronological order corresponding to the image frames to generate a feature matrix; and step 24: processing the feature matrix by using a pre-trained convolutional neural network, to obtain a processing result of the video stream.

First, in step 21, the video stream to be processed is obtained. Understandably, the video stream is generally stable and continuously transmitted video data. One video stream can include a plurality of image frames. The video stream can be collected by various camera apparatuses, for example, a camera and a camera lens apparatus in a smartphone.

In one implementation, the video stream can be pre-stored on the execution body of the implementation in the present specification. In such a case, the video stream can be locally obtained.

In another implementation, the video stream can be obtained by the execution body through a wired or wireless network. For example, the execution body is a server and a remote device is a camera, a smartphone, etc. that has video recording and communication functions.

In another implementation, the video stream can alternatively be collected on scene by a collection module (for example, a camera lens) integrated on the execution body. In such a case, the video stream is not directly integrally obtained once and for all, but is continuously obtained at a shooting interval of image frame.

In more implementations, the video stream can be obtained in more ways. No limitation is imposed here.

After the video stream is obtained, the video stream can be pre-processed to produce a circumstance that allows the convolutional neural network to be used for analysis.

Therefore, in step 22, the features of the S image frames in the video stream are separately extracted, and the S N-dimensional feature vectors are generated.

Understandably, quantities of image frames in different video streams are possibly different. In one implementation, S can be a frame quantity of image frames in the video stream, and features can be extracted from all the S image frames. In another implementation, S is a predetermined value, for example, 30. The S image frames can be extracted from the obtained video stream at a predetermined time interval or a predetermined frame interval, etc., and features are extracted. In an example of a predetermined time interval, one image frame can be extracted every 500 milliseconds. In more implementations, there can be more methods for determining the S image frames from the video stream for feature extraction, which are not listed one by one here.

Notably, the method for processing a video stream in the implementation of the present specification is particularly applicable to video stream processing within a specified time length (for example, 30 seconds), for example, a video shot on scene during damage identification on a damaged vehicle.

For the image frames, the extracted features can be some predetermined features. These features are usually features related to an analysis demand on the video stream in a specific scenario. For example, in a vehicle damage identification scenario, all extracted features can be features that describe a damaged part and a damage degree, etc. A feature extraction process can be determined by using a corresponding pre-trained algorithm or model, or can be detected by using a predetermined parameter threshold (for example, a brightness threshold). No limitation is imposed here.

For clearer description, assuming that any image frame in the S image frames is a first image frame, for the first image frame, in one possible implementation method, a process of extracting features from the first image frame can include the following: performing target identification on the first image frame, to determine a target feature of the first image frame. Understandably, target identification can be the purpose of image processing. For example, in a scenario of damage identification on a damaged vehicle, a target here can be, for example, a damaged part and a damage degree. The target feature can include one or more of a damaged part, a damaged material, and a damage category.

The target can be determined by using a pre-trained identification model. Training samples of the identification model can include a plurality of pictures that are pre-labeled with a target label (for example, a bumper scratch). The pictures in the training samples are sequentially input to a selected neural network model, for example, a model such as a decision tree, a support vector machine (SVM), or a CNN, and model parameters are adjusted based on the pre-labeled target label, to train the previous identification model.

In another possible implementation method, the process of extracting features from the first image frame can include the following: determining a change feature of the first image frame based on a comparison between the first image frame and a previous image frame. The change feature can be used to describe a change status between a current image frame and a previous image frame. Understandably, in a video stream collection process, images of a moving object can be collected by using a stationary collection apparatus (for example, a fixed surveillance camera), or images of a stationary object (for example, a damaged vehicle) can be collected by using a moving collection apparatus (for example, a smartphone), or images of a moving object can be collected by using a moving collection apparatus (for example, a smartphone), etc. Therefore, a processing method for determining a change feature of an image frame can vary with a scenario.

Understandably, when an object is moving, a brightness mode of a point corresponding to the object is also moving on an image. Such an apparent motion of the image brightness mode is an optical flow. The optical flow can express a change of an image. Because the optical flow contains information about a target's motion, the optical flow can be used to determine a motion status of the target. An optical flow field can be further derived from the description of the optical flow, and is used to represent a two-dimensional (2D) transient velocity field constituted by all pixels in an image. As such, in an implementation, an optical flow change from the previous image frame to the first image frame can be used as the change feature of the first image frame. The optical flow change can be implemented by using a method such as an optical flow model. There are a plurality of forms of optical flow models. For example, two pictures (for example, the first image frame and the previous image frame) can be input together to one "linear" CNN, and a result of optical flow output is an offset of each pixel. In an optional implementation method, one position point (for example, an upper left corner of a left front vehicle lamp) contained in both the image frames can be selected as a reference point. In the two image frames, the reference point corresponds to a first coordinate in the first image frame and a second coordinate in the previous image frame. As such, offset coordinates of the first coordinate and the second coordinate can be determined as the change feature of the first image frame. The same two-dimensional coordinate system can be selected for the two image frames, for example, a coordinate system with an image's center point as an origin and with a direction of a long edge as a horizontal axis. The first coordinate and the second coordinate correspond to two-dimensional coordinates in the coordinate system.

In another aspect, in a video stream, a moving speed of a collection device is always lower than an image frame collection speed. Therefore, two adjacent image frames can include the same feature point. A feature point of an image is a point, in the image, that has a distinctive characteristic, can effectively reflect an essential feature of the image, and can identify a target object in the image. The feature point can be determined by using a scale-invariant feature transform (SIFT), a local binary pattern (LBP), and so on, and details are omitted for simplicity here. As such, in an implementation, a change between two adjacent images can be evaluated based on an offset of a feature point. The offset of the feature point can be described by using a projection matrix. For example, assuming that a feature point set of the first image frame is Y, and a feature point set of the previous image frame is X, a transform matrix w can be solved so that a result of f(X)=Xw approaches Y as far as possible. In such a case, the solved transform matrix w can be used as a projection matrix from the previous image frame to the first image frame. Further, the offset matrix can be used as the change feature of the first image frame.

In another implementation, a structure similarity between the first image frame and the previous image frame can be further used to determine the change feature of the first image frame. The structure similarity can be measured by using a structural similarity index measurement (SSIM) index. In other words, an SSIM index between the first image frame and the previous image frame can be used as the change feature of the first image frame. For example, Y is used to represent the first image frame, and X is used to represent the previous image frame. A method for calculating the SSIM index between X and Y is as follows:

$$SSIM(X, Y) = \frac{(2U_X \times U_Y + C1) \times (2P_{iXY} + C2)}{(U_X^2 + U_Y^2 + C1) \times (P_{iX}^2 + P_{iY}^2 + C2)}$$

$U_X$ is an average grayscale value of pixels of X, $U_Y$ is an average grayscale value of pixels of Y, and $U_x$ and $U_Y$ are respectively brightness estimates of X and Y. $P_{iX}^2$ is a variance determined based on grayscale values of the pixels in X, $P_{iY}^2$ is a variance determined based on grayscale values of the pixels in Y, and $P_{iX}^2$ and $P_{iY}^2$ are respectively contrast estimates of X and Y. $P_{iXY}$ is a covariance of the grayscale values of the pixels in X and Y. C1 and C2 are constants used to stabilize a division operation. A maximum value of the SSIM index is 1. A larger SSIM index indicates a higher structure similarity between the two images. When the SSIM index is 1, structures of the two images are the same.

In more implementation methods, there are more methods for determining the change feature of the first image frame, and details are omitted for simplicity here. Notably, the previously described implementations related to the change feature can be separately used or can be combined for use. No limitation is imposed here.

When the first image frame is the 1st image frame in the video stream, the first image frame itself can be used as its own previous image frame for comparison to determine the change feature of the first image frame. Or, the change feature of the first image frame can be directly determined as a predetermined value, for example, each element in the projection matrix is 1, or optical flow output is 0.

In another possible implementation method, a person skilled in the art can understand that the extracted features of the first image frame can further include other features based on different application scenarios, for example, one or more of a resolution feature, an illumination feature, a target presence feature (whether a target is contained), a shooting angle feature (whether high-angle shooting is used), etc. These features can be bound based on the previous method so that they are included in the generated N-dimensional feature vectors.

In a possible design, change features such as the target feature can further be merged. In such a case, the change feature (for example, the projection matrix) of the first image frame can be determined first. When the first image frame and the previous image frame contain the same target, a target feature of the previous image frame can be mapped to the first image frame, for example, a bumper scratch feature of the previous image frame can be added to the first image frame so that the target feature of the first image frame does not need to be obtained through target identification.

When only one feature is extracted from each of the S image frames in the video stream, the feature can be used to generate a feature vector corresponding to the image frame. In such a case, the feature vector can be N-dimensional.

In another aspect, if a plurality of features are extracted from each of the S image frames in the video stream, feature values of the plurality of features can be combined and bound to generate an N-dimensional feature vector.

N can be a predetermined positive integer, and each dimension in the feature vector represents a feature value of a predetermined feature.

If a certain feature (for example, the previous change feature) of each image frame includes a matrix (for example, the projection matrix), because the feature vector of the first image frame is an N-dimensional feature vector, flattening or binding processing can be further performed on the matrix, for example, columns of the projection matrix can be bound and arranged to obtain a k-dimensional one-column vector, as a part of the N-dimensional feature vector, where N≥k.

As such, the S N-dimensional feature vectors can be obtained for the S image frames in the video stream. Further, in step 23, the S N-dimensional feature vectors are arranged based on the chronological order corresponding to the image frames to generate the feature matrix. The feature matrix has N rows and at least S columns.

Understandably, the feature matrix can be processed by using the pre-trained neural network, and a size of the feature matrix is usually predetermined. If the S image frames in the video stream are extracted based on a predetermined frame quantity S, that is, a predetermined quantity of columns in the feature matrix is S, the S N-dimensional feature vectors can be directly combined and arranged to generate an N-dimensional S-column matrix as the feature matrix of the video stream. However, a length of a video possibly cannot be known in advance, and a value of S cannot be predetermined. If the predetermined quantity of columns in the feature matrix is M, when S=M, the S N-dimensional feature vectors can also be directly combined to form the feature matrix; or when S<M, the feature matrix of the predetermined size cannot be generated by simply combining the feature vectors.

Therefore, in a possible design, M−S feature vectors can be supplemented to the S N-dimensional feature vectors by using an interpolation method, to generate a feature matrix with N rows and M columns. Understandably, when the M−S feature vectors are supplemented, two issues are involved: One issue lies in positions for supplementing the feature vectors, and the other issue lies in what kind of feature vectors are to be supplemented.

For the first issue, in an optional implementation method, the positions for supplementing the feature vectors are evenly distributed, for example, (M−S)/S is used to determine a specific feature vector interval, and one feature vector is supplemented at the interval. As shown in FIG. 3, assuming that one N-dimensional feature vector is interpolated at an interval of two feature vectors, positions pointed by arrows corresponding to $C_0$, $C_1$, $C_2$, and $C_3$ are the positions for supplementing the feature vectors. Notably, the positions for supplementing feature vectors in FIG. 3 are examples. In specific implementation, a position after $X_{11}$ or $X_{21}$ can alternatively be used as the 1st position (corresponding to $C_0$) for supplementing a feature vector.

The second issue is to determine a specific value of each dimension for supplementing the feature vectors. For ease of description, any determined position for supplementing a feature vector is referred to as a first interpolation position, for example, the positions pointed by the arrows corresponding to $C_0$, $C_1$, $C_2$, and $C_3$. In an optional implementation method, a feature vector nearest to the first interpolation position is used as a feature vector to be interpolated into the first interpolation position. For example, a feature vector $[X_{11}, X_{12}, \ldots, X_{1N}]$ is interpolated into the position pointed by the arrow corresponding to $C_0$. When the first interpolation position has two nearest feature vectors, one feature vector can be randomly selected and interpolated into the first interpolation position, or a corresponding feature vector can be selected based on a predetermined selection rule (for example, the last one is selected) and interpolated into the first interpolation position. No limitation is imposed herein. In another optional implementation method, bilinear interpolation can further be performed on elements corresponding to r feature vectors neighboring to the first interpolation position; and a feature vector to be interpolated into the first interpolation position can be determined based on an interpolation result. r can be a predetermined value, for example, 4. Referring to FIG. 3, the position pointed by the arrow corresponding to $C_1$ is used as an example. $X_{11}$, $X_{21}$, $X_{31}$, and $X_{41}$ are considered as points in a two-dimensional coordinate system with a horizontal axis indicating time and a vertical axis indicating a feature value, and a bilinear interpolation operation is performed to obtain a value (a vertical axis coordinate) of the first dimension of the N-dimensional feature vector to be interpolated into the position (a horizontal axis coordinate is known) corresponding to $C_1$. By analogy, values of all dimensions of the N-dimensional feature vector to be interpolated into the position corresponding to $C_1$.

In addition to the previous interpolation method, there are other interpolation methods. In another possible design, M−S feature vectors same as the N-dimensional feature vector of the last frame can alternatively be supplemented after the last frame, to form M N-dimensional feature vectors, which are combined into the feature matrix with N rows and M columns. The interpolation methods are not listed one by one here.

In step 23, the feature matrix that can be processed by using the pre-trained convolutional neural network can be generated for the video stream based on the predetermined size. Therefore, in step 24, the feature matrix can be processed by using the pre-trained convolutional neural network, to obtain the processing result of the video stream.

Understandably, when the convolutional neural network processes an image, a format of a matrix that is input to the convolutional neural network is usually "batch processing size (batch_size)*length*width*quantity of channels". Channels for a colorful image are generally three channels: "R", "G", and "B", that is, the quantity of channels is 3. Obviously, in the format, the length and the width are mutually independent, but the channels affect each other. Similarly, in a two-dimensional convolutional operation on the feature matrix, features in different spatial positions of the image are independent. The two-dimensional convolutional operation has space invariance. Convolution is generally performed on the "length*width" dimensions during the image processing process. If "length*width" are replaced with a row quantity and a column quantity of the feature matrix, in a feature dimension, features in different positions affect each other, instead of being mutually independent, and performing convolution on the feature matrix is illogical. For example, when a damage detail image is extracted, features of a plurality of dimensions such as detail image categorization and a damage detection result need to be involved. In other words, the space invariance holds true in the time dimension but holds false in the feature dimension. The feature dimension here can correspond to nature of a channel dimension in image processing. Therefore, the input format of the feature matrix can be adjusted, for example, adjusted into "batch processing size (batch_size) *1*column quantity (for example, S or M)*row quantity (N)". As such, convolution can be performed on the "1*column quantity (for example, M)" dimension, and each column is a set of features at one moment. Correlation between features can be dug out by performing convolution on the time dimension.

In an implementation, the convolutional neural network can include one or more convolution processing layers and an output layer. The convolution processing layers can be composed of a two-dimensional convolution layer, an activation layer, and a normalization layer, for example, 2D convolutional filter+ReLU+batch normalization.

Figure 4:
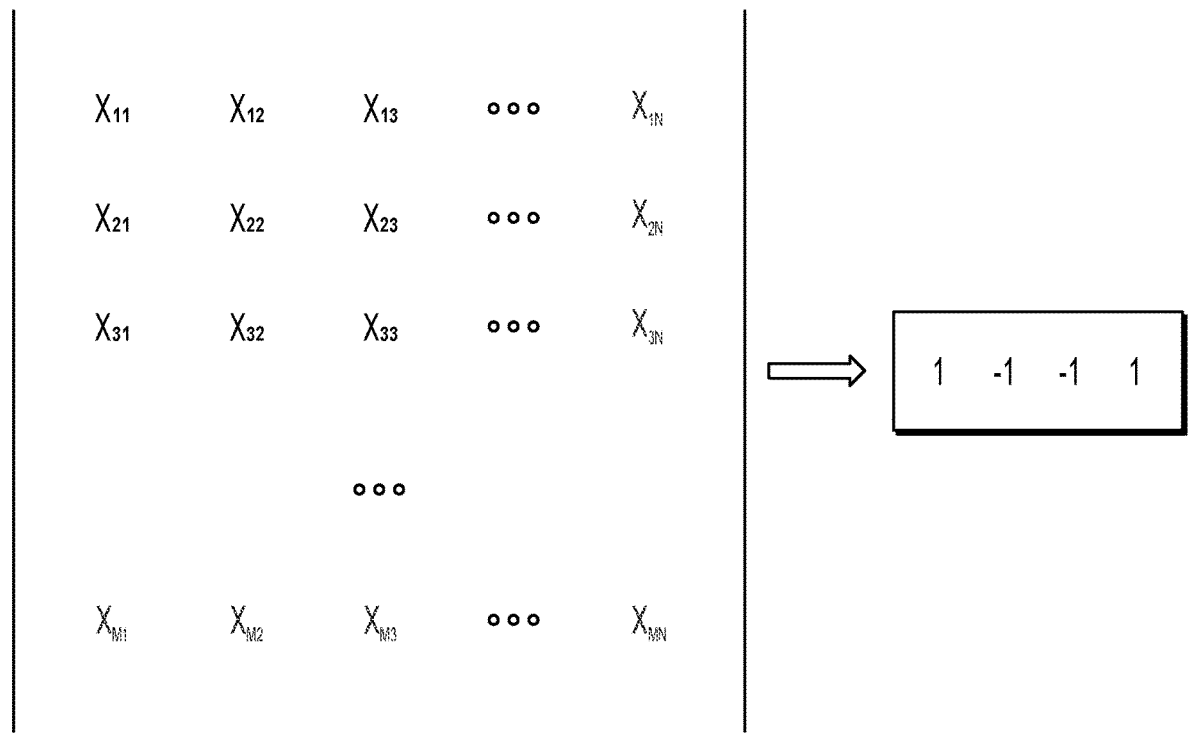
FIG. 4 is a schematic diagram illustrating convolution on a feature matrix, according to a specific example.

The two-dimensional convolution layer can be used to perform convolution processing on the feature matrix by using a convolution kernel corresponding to the time dimension. As shown in FIG. 4, the N×M feature matrix is converted into an M×N matrix through the previous format, and a convolution operation can be performed by using a convolution kernel such as (1,−1,−1,1) in correspondence to the time dimension. In a convolutional neural network training process, targeted training of convolution kernels can be performed. For example, one convolution kernel can be trained for each feature. For example, the convolution kernel (1,−1,−1,1) illustrated in FIG. 4 corresponds to a convolution kernel for a part damage feature in a vehicle damage detection scenario. As such, one feature (for example, the part damage feature in the vehicle damage detection scenario) can be identified through a convolution operation of each convolution kernel.

The activation layer can be used to perform non-linear mapping on an output result of the two-dimensional convolution layer. The activation layer can be implemented by using an excitation function such as Sigmoid, Tanh (hyperbolic tangent), or ReLU. With the activation layer, the output result of the two-dimensional convolution layer is mapped into a non-linear-change value between 0 and 1.

As the network deepens, an output result passing through the activation layer will possibly move towards a gradient saturated region (corresponding to a region, where the excitation function has a relatively small gradient change in the region). In such a case, the convolutional neural network converges slowly or does not converge as a gradient is reduced or disappears. Therefore, the batch normalization layer can further be used so that the output result of the activation layer falls back within a region, where the excitation function has an obvious gradient change in the region.

The output layer is used to output the processing result of the video stream. A processing result that is output by the output layer varies with a scenario and a purpose of video stream processing.

For example, in a key frame extraction application scenario, an extracted key frame can be an image frame of great significance to a result, for example, an image frame containing damage in a vehicle damage identification video stream. If vehicle damage is discontinuous, key frames can further be extracted based on segments. In such a case, the processing result that is output by the output layer can be a two-dimensional array that represents a time range, such as $[t_1, t_2]$, where $t_1$ represents a key frame start time, and $t_2$ represents a key frame end time. In some optional implementations, $t_1$ and $t_2$ can further be normalized values. For example, if there are a total of 30 image frames, the 18th to the 25th frames can be expressed as [18/30, 25/30]. Normalization can alleviate gradient explosion for output, or alleviate a lack of convergence for the output result.

In such a case, a plurality of sample video streams can be first obtained in the convolutional neural network training process. After the pre-processing in steps 22 to 26 is performed on these video streams, sample feature matrices can be obtained. Each sample feature matrix is a matrix with N rows and at least S columns. Each video stream can further have a time period label that labels a position of a key frame in advance. Then, all the sample feature matrices and time period labels can be used to train a model. The time period label here is a two-dimensional array used to describe a start moment and an end moment of a time period, for example, $[t_1, t_2]$ described above. The start moment and the end moment can be relative moments that are calculated starting from the 1st image frame of the video stream. The relative moment can be a relative description such as the 5th second or the 5th frame. Optionally, each element in the two-dimensional array is a ratio of a corresponding relative moment to a total time length of the video stream. Correspondingly, the total time length of the video can be described by using 30 seconds, 60 frames, and so on. No limitation is imposed here.

As known by a person skilled in the art, based on the sample feature matrices and the time period labels corresponding to the samples, model parameters can be adjusted through, for example, gradient descent. In the model training process, a loss function can be, for example, a quadratic sum of differences between respective prediction functions and label values of the plurality of samples, or a sum of absolute values of the differences between the respective prediction functions and label values of the plurality of samples, etc. The following provides a description by using an example that a minimum squared-error (MSE) method is used to calculate a loss function.

An output value obtained by substituting a sample feature matrix of a first sample (the kth sample) into the model is [yk1, yk2], and a time period label corresponding to the sample feature matrix is [yk10, yk20], which is substituted into a loss function L1 of the model:

$$L1 = \frac{1}{k} \times \sum_k ((y_{k10} - y_{k1})^2 + (y_{k20} - y_{k2})^2)$$

It can be seen that, a prediction function of a front sample is further related to a result of a prediction function of a rear sample. Subsequently, a gradient of a model parameter is solved in the loss function, and a parameter value is adjusted in an opposite direction of the gradient so that a value of the loss function in the trained model decreases.

In some implementations, if the key frame that is finally extracted is one image frame, a processing result, output by the convolutional neural network, of a video stream in a time range of the key frame can further be post-processed. For example, based on a predetermined priority-based extraction rule, the 1st detected image frame that satisfies a resolution demand is extracted. The predetermined priority-based extraction rule can be, for example, performing extraction starting from a frame in the middle to frames on both sides.

For another example, in an application scenario that a damaged part and a handling policy (for example, renewal or repair) are determined by using a video stream shot for a damaged vehicle, the processing result that is output by the convolutional neural network can be, for example, a predetermined multi-dimensional array composed of parts handling decisions.

In such a case, a convolution kernel at each convolution processing layer in the convolutional neural network can identify one of the features. Therefore, training samples for the convolutional neural network can also be a plurality of video streams. After the pre-processing in steps 22 to 26 is performed on these video streams, sample feature matrices can be obtained. Each sample feature matrix is a matrix with N rows and at least S columns. Each video stream can further have a handling decision label that is labeled in advance. These handling decision labels can be determined based on actual vehicle handling results, and can include at least one item such as renewal and repair, etc. Understandably, for the damaged vehicle, there can be a plurality of damaged parts, and there can be a plurality of handling decisions (for example, renewal and repair). Therefore, the handling decision label can be a multi-dimensional array, and each element value in the array corresponds to a handling decision on a related part. Then, all the sample feature matrices and handling decision labels can be used to train the convolutional neural network.

As known by a person skilled in the art, based on the sample feature matrices and the handling decision labels corresponding to the samples, model parameters can be adjusted through, for example, gradient descent. A loss function in the model training process can be, for example, a Sigmoid function or a mean square error. The following provides a description by using an example that the loss function is calculated in a Sigmoid function way.

Output obtained by substituting the sample feature matrix of the first sample into the model is one r-dimensional vector $Y_1$, and a damage identification result label corresponding to the sample feature matrix is $Y_0$. After one smooth operation is performed on $Y_1$, the following is obtained:

$H_k = 1/(1+\exp(-Y_1))$

Substitution into a loss function L2 of the model:

$L2 = -\Sigma_k(Y_0 * \log(H_k) + (I-Y_0) * \log(I-H_k))/r$

I is a unit vector. "*" represents solving an inner product of the vector. It can be seen that, a prediction function of a front sample is further related to a result of a prediction function of a rear sample. Subsequently, a gradient of a model parameter is solved in the loss function, and a parameter value is adjusted in an opposite direction of the gradient so that a value of the loss function in the trained model decreases.

In some implementations, an output result of the convolutional neural network can be corresponding probability, for example, repair or renewal probability of a front bumper. A final decision result can be output by comparing the probability with a corresponding threshold. The corresponding threshold can be predicted by using the trained convolutional neural network based on a sample set different from a training set, and is determined in combination with a prediction precision demand.

In more application scenarios, the convolutional neural network can further provide output results corresponding to scenarios, which are not listed one by one here.

Referring back to the previous processes, in the video stream processing process, time-domain signals are collected, pre-processing such as feature extraction is performed on the images of the video stream, and the feature vectors of the image frames are combined to generate the feature matrix that can be processed by the convolutional neural network. As such, the convolutional neural network can be used to comprehensively analyze the image frames in the video stream. In addition, different designs of the output layer of the convolutional neural network can be applied to different video processing issues, to more effectively process the video stream.

Figure 5:
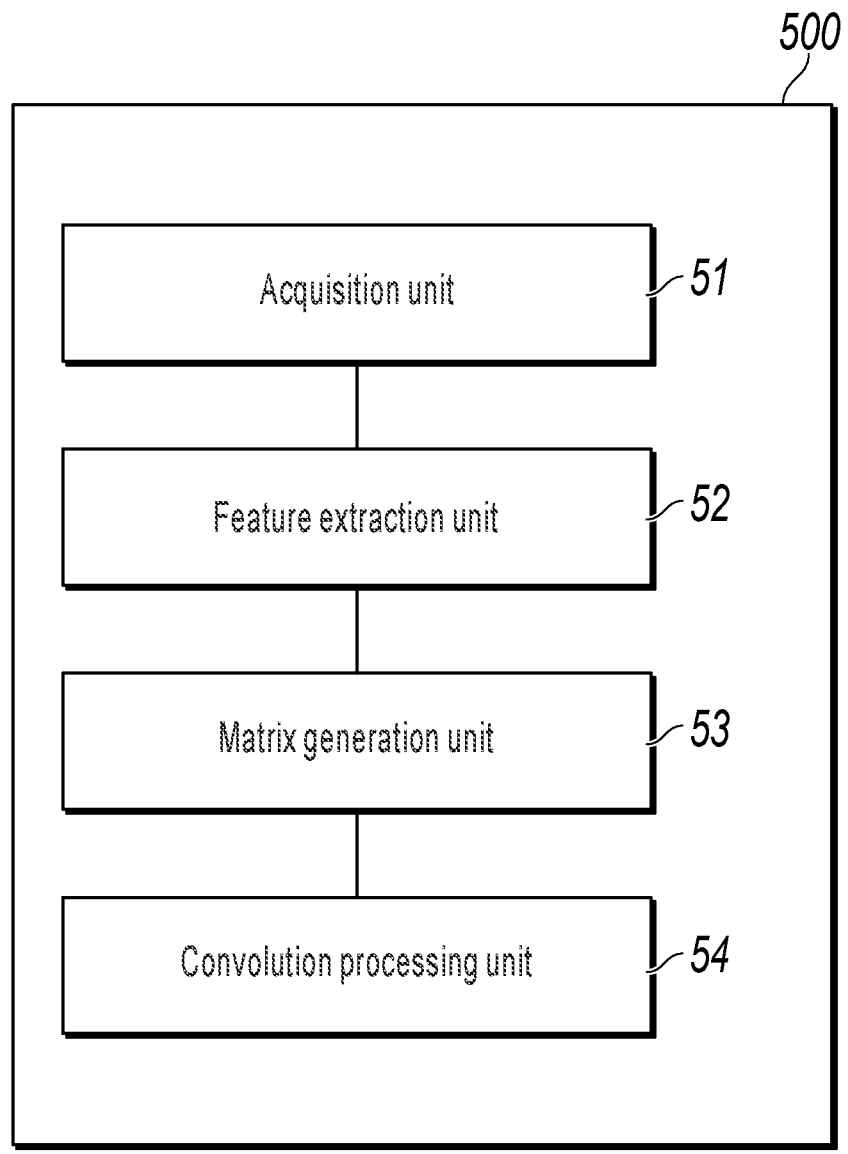
FIG. 5 is a schematic block diagram illustrating an apparatus for processing a video stream, according to an implementation.

An implementation according to another aspect further provides an apparatus for processing a video stream. FIG. 5 is a schematic block diagram illustrating the apparatus for processing a video stream, according to the implementation. As shown in FIG. 5, an apparatus 500 for processing a video stream includes an acquisition unit 51, configured to obtain a video stream to be processed; a feature extraction unit 52, configured to extract features of S image frames in the video stream, and generate S N-dimensional feature vectors; a matrix generation unit 53, configured to arrange the N-dimensional feature vectors in a chronological order corresponding to the image frames, to generate a feature matrix, where the feature matrix has N rows and at least S columns; and a convolution processing unit 54, configured to process the feature matrix by using a pre-trained convolutional neural network, to obtain a processing result of the video stream.

For ease of description, assume that any image frame in the S image frames is a first image frame.

In an implementation method, the feature extraction unit 52 is further configured to determine a change feature of the first image frame based on a comparison between the first image frame and a previous image frame.

In an implementation, the feature extraction unit 52 can use an optical flow change from the previous image frame to the first image frame as the change feature.

In another implementation, the feature extraction unit 52 can determine, as the change feature of the first image frame, an SSIM index between the first image frame and the previous image frame that is determined by using a structural similarity model.

In another implementation, the feature extraction unit 52 can determine a projection matrix for converting the previous image frame into the first image frame based on a conversion relationship between the first image frame and the previous image frame; and use the projection matrix as the change feature.

Notably, when the first image frame is the 1st image frame in the video stream, the feature extraction unit 52 can determine that the change feature includes a predetermined value, or determine that the previous image frame and the first image frame are a same image frame.

According to another implementation method, the feature extraction unit 52 can be further configured to perform target identification on the first image frame in the S image frames, to determine a target feature of the first image frame. When the video stream is a video stream for a damaged vehicle, the target feature can include one or more of a damaged part, a damaged material, and a damage category.

According to another implementation method, the feature extraction unit 52 can be further configured to detect one or more of the following items for the first image frame in the S image frames: whether fuzziness exists, whether a target is contained, whether illumination is sufficient, and whether a shooting angle is a predetermined angle, and use a detection result as a corresponding feature of the first image frame.

Further, the matrix generation unit 53 can combine feature values corresponding to the features, of the image frames, extracted by the feature extraction unit 52, to generate one N-dimensional feature vector.

In a possible design, the matrix generation unit 53 can further supplement M–S feature vectors to the S N-dimensional feature vectors by using an interpolation method, to generate a feature matrix with N rows and M columns.

For a first interpolation position, the interpolation method includes one of the following: using a feature vector nearest to the first interpolation position as a feature vector to be interpolated into the first interpolation position; and performing bilinear interpolation on elements corresponding to r feature vectors neighboring to the first interpolation position; and determining, based on an interpolation result, a feature vector to be interpolated into the first interpolation position.

In an implementation, the convolutional neural network performs convolution processing on the feature matrix by using at least one convolution kernel. The convolution kernel sequentially processes a plurality of feature values of each time dimension in the feature matrix.

When the convolutional neural network is used to extract a key image frame in the video stream, the apparatus 500 can further include a first model training unit, configured to train the convolutional neural network in the following way: obtaining a plurality of sample video streams, where each sample video stream corresponds to a corresponding sample feature matrix with N rows and at least S columns that is generated by extracting features from S image frames in the video stream; and obtaining a time period label that labels a position of a key frame; and using all the sample feature matrices and time period labels to train the convolutional neural network so that a result of a loss prediction function of the trained model corresponding to the samples decreases compared to a result of a loss prediction function used before the training.

When the convolutional neural network is used to make a vehicle handling decision on the video stream, the apparatus 500 can further include a second model training unit, configured to train the convolutional neural network in the following way: obtaining a plurality of sample video streams, where each sample video stream corresponds to a corresponding sample feature matrix with N rows and at least S columns that is generated by extracting features from S image frames in the video stream; and obtaining a handling decision label that corresponds to an actual vehicle; and using all the sample feature matrices and corresponding handling decision labels to train the convolutional neural network so that a result of a loss function of the trained model corresponding to the samples decreases compared to a result of a loss function used before the training.

Optionally, the handling decision label is a multi-dimensional vector, and a plurality of elements in the handling decision label include renewal probability of each vehicle part and repair probability of each vehicle part.

Notably, the apparatus 500 illustrated in FIG. 5 is an apparatus implementation corresponding to the method implementation illustrated in FIG. 2. Corresponding descriptions in the method implementation illustrated in FIG. 2 are also applicable to the apparatus 500, and details are omitted for simplicity.

An implementation according to another aspect further provides a computer-readable storage medium, where the computer-readable storage medium stores a computer program, and when the computer program is run on a computer, the computer is enabled to perform the method described with reference FIG. 2.

An implementation according to another aspect further provides a computing device, including a memory and a processor, where the memory stores executable code, and when the processor executes the executable code, the method described with reference FIG. 2 can be implemented.

A person skilled in the art should be aware that in the earlier-described one or more examples, functions described in the present disclosure can be implemented by hardware, software, firmware, or any combination thereof. When the present disclosure is implemented by software, the previous functions can be stored in a computer-readable medium or transmitted as one or more instructions or code in the computer-readable medium.

The objectives, technical solutions, and benefits of the present disclosure are further described in detail in the earlier-described specific implementation methods. It should be understood that the earlier-described descriptions are merely specific implementation methods of the present disclosure, but are not intended to limit the protection scope of the present disclosure. Any modification, equivalent replacement, or improvement made on the basis of the technical solutions of the present disclosure shall fall within the protection scope of the present disclosure.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:
1. A computer-implemented method for processing a video stream, comprising:
   obtaining, from a user, a video stream captured for an object;

extracting features of S image frames in the video stream;
generating S N-dimensional feature vectors by generating a respective N-dimensional feature vector for each image frame of the S image frames;
arranging the S N-dimensional feature vectors in a chronological order corresponding to the order in which the image frames occur in the video stream to generate a feature matrix, wherein the feature matrix has N rows and M columns, wherein S is smaller than M, wherein the arranging comprises inserting each N-dimensional feature vector of the S N-dimensional feature vectors into a respective column of the feature matrix;
generating, based on an interpolation method and at least a part of the S N-dimensional feature vectors, M-S N-dimensional feature vectors;
inserting each N-dimensional feature vector of the M-S N-dimensional feature vectors into a respective column of the feature matrix; and
processing the feature matrix by using a pre-trained convolutional neural network, to obtain a processing result for the object captured in the video stream.

2. The computer-implemented method according to claim 1, wherein the S image frames comprise a first image frame, and wherein extracting the features of the S image frames in the video stream comprises:
determining a change feature of the first image frame based on a comparison between the first image frame and a previous image frame.

3. The computer-implemented method according to claim 2, wherein the S image frames comprise the first image frame, and wherein extracting the features of the S image frames in the video stream further comprises:
using an optical flow change from the previous image frame to the first image frame as the change feature.

4. The computer-implemented method according to claim 2, wherein the S image frames comprise the first image frame, and wherein extracting the features of the S image frames in the video stream further comprises:
determining, as the change feature of the first image frame, a structural similarity index measurement (SSIM) index between the first image frame and the previous image frame that is determined by using a structural similarity model.

5. The computer-implemented method according to claim 2, wherein the S image frames comprise the first image frame, and wherein extracting the features of the S image frames in the video stream further comprises:
determining a projection matrix for converting the previous image frame into the first image frame; and
using the projection matrix as the change feature.

6. The computer-implemented method according to claim 2, wherein the first image frame is the 1st image frame corresponding to the chronological order in the video stream, and wherein the computer-implemented method further comprises:
determining that the change feature comprises a predetermined value; or
determining that the previous image frame and the first image frame are a same image frame.

7. The computer-implemented method according to claim 1, wherein extracting the features of the S image frames in the video stream comprises:
performing target identification on a first image frame in the S image frames, to determine a target feature of the first image frame.

8. The computer-implemented method according to claim 7, wherein the video stream is a video stream for a damaged vehicle, and wherein the target feature comprises one or more of a damaged part, a damaged material, and a damage category.

9. The computer-implemented method according to claim 1, wherein extracting the features of the S image frames in the video stream comprises:
detecting one or more of the following items for a first image frame in the S image frames: whether fuzziness exists, whether a target is contained, whether illumination is sufficient, and whether a shooting angle is a predetermined angle; and
using a detection result as a corresponding feature of the first image frame.

10. The computer-implemented method according to claim 1, wherein generating the S N-dimensional feature vectors comprises:
combining feature values corresponding to features of a first image frame, to generate one N-dimensional feature vector.

11. The computer-implemented method according to claim 1, wherein arranging the S N-dimensional feature vectors in the chronological order corresponding to the order in which the image frames occur in the video stream to generate the feature matrix comprises:
supplementing MS feature vectors to the S N-dimensional feature vectors by using an interpolation method, to generate a feature matrix with N rows and M columns.

12. The computer-implemented method according to claim 11, wherein the interpolation method comprises:
determining a first interpolation position; and
determining a feature vector to be interpolated into the first interpolation position, comprising at least one of:
using a feature vector nearest to the first interpolation position as the feature vector to be interpolated into the first interpolation position; or
performing bilinear interpolation on elements corresponding to r feature vectors neighboring to the first interpolation position to determine the feature vector to be interpolated into the first interpolation position.

13. The computer-implemented method according to claim 1, wherein the convolutional neural network performs convolution processing on the feature matrix by using at least one convolution kernel, and wherein the at least one convolution kernel sequentially processes a plurality of feature values of each time dimension in the feature matrix.

14. The computer-implemented method according to claim 13, wherein the convolutional neural network is used to extract a key image frame in the video stream, and wherein training the convolutional neural network comprises:
obtaining a plurality of sample video streams, wherein each sample video stream corresponds to a sample feature matrix of a plurality of sample feature matrices, and wherein each sample feature matrix comprises N rows and at least S columns that is generated by extracting features from S image frames in the video stream;
obtaining a plurality of time period labels corresponding to the plurality of sample video streams, wherein each time period label corresponds to a position of a key frame, wherein the each time period label comprises a two-dimensional array used to describe a start moment and an end moment of a time period, and wherein the start moment and the end moment are relative moments of a 1st image frame of the video stream corresponding to the chronological order; and using the plurality of sample feature matrices and the plurality of time period labels to train the convolutional neural network so that a result of a loss prediction function of the trained convolutional neural network corresponding to the plurality of sample video streams decreases compared to a result of a loss prediction function before training.

15. The computer-implemented method according to claim 13, wherein the convolutional neural network is used to make a vehicle handling decision on the video stream, and wherein training the convolutional neural network comprises:

obtaining a plurality of sample video streams, wherein each sample video stream corresponds to a sample feature matrix of a plurality of sample feature matrices, and wherein each sample feature matrix comprises N rows and at least S columns that is generated by extracting features from S image frames in the video stream;

obtaining a plurality of handling decision labels corresponding to the plurality of sample feature matrices, wherein each handling decision label corresponds to an actual vehicle; and using the plurality of sample feature matrices and the plurality of handling decision labels to train the convolutional neural network so that a result of a loss prediction function of the trained convolutional neural network corresponding to the plurality of sample video streams decreases compared to a result of a loss prediction function before training.

16. The computer-implemented method according to claim 15, wherein the handling decision label is a multi-dimensional vector, and wherein a plurality of elements in the handling decision label comprise renewal probability of each vehicle part and repair probability of each vehicle part.

17. The computer-implemented method according to claim 1, wherein the processing result comprises a time range of the video stream, and wherein the time range corresponds to one or more key image frames that are of significance to a decision on the object captured in the video stream.

18. The computer-implemented method according to claim 1, wherein the object captured in the video stream is a damaged vehicle, and wherein the processing result comprises information identifying at least one damaged part of the damaged vehicle and corresponding at least one handling decision of the damaged part.

19. A non-transitory, computer-readable medium storing one or more instructions executable by a computer system to perform operations comprising:

obtaining, from a user, a video stream captured for an object;

extracting features of S image frames in the video stream;

generating S N-dimensional feature vectors by generating a respective N-dimensional feature vector for each image frame of the S image frames;

arranging the S N-dimensional feature vectors in a chronological order corresponding to the order in which the image frames occur in the video stream to generate a feature matrix, wherein the feature matrix has N rows and M columns, wherein S is smaller than M, wherein the arranging comprises inserting each N-dimensional feature vector of the S N-dimensional feature vectors into a respective column of the feature matrix;

generating, based on an interpolation method and at least a part of the S N-dimensional feature vectors, M-S N-dimensional feature vectors;

inserting each N-dimensional feature vector of the M-S N-dimensional feature vectors into a respective column of the feature matrix; and processing the feature matrix by using a pre-trained convolutional neural network, to obtain a processing result for the object captured in the video stream.

20. The non-transitory, computer-readable medium according to claim 19, wherein the S image frames comprise a first image frame, and wherein extracting the features of the S image frames in the video stream comprises:

determining a change feature of the first image frame based on a comparison between the first image frame and a previous image frame.

21. The non-transitory, computer-readable medium according to claim 20, wherein the S image frames comprise the first image frame, and wherein extracting the features of the S image frames in the video stream further comprises:

using an optical flow change from the previous image frame to the first image frame as the change feature.

22. The non-transitory, computer-readable medium according to claim 20, wherein the S image frames comprise the first image frame, and wherein extracting the features of the S image frames in the video stream further comprises:

determining, as the change feature of the first image frame, a structural similarity index measurement (SSIM) index between the first image frame and the previous image frame that is determined by using a structural similarity model.

23. The non-transitory, computer-readable medium according to claim 20, wherein the S image frames comprise the first image frame, and wherein extracting the features of the S image frames in the video stream further comprises:

determining a projection matrix for converting the previous image frame into the first image frame; and using the projection matrix as the change feature.

24. The non-transitory, computer-readable medium according to claim 20, wherein the first image frame is the 1st image frame corresponding to the chronological order in the video stream, and wherein the operations further comprise:

determining that the change feature comprises a predetermined value; or determining that the previous image frame and the first image frame are a same image frame.

25. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, from a user, a video stream captured for an object;

extracting features of S image frames in the video stream;

generating S N-dimensional feature vectors by generating a respective N-dimensional feature vector for each image frame of the S image frames;

arranging the S N-dimensional feature vectors in a chronological order corresponding to the order in which the image frames occur in the video stream to generate a feature matrix, wherein the feature matrix has N rows and M columns, wherein S is smaller than M, wherein the arranging comprises inserting each N-dimensional feature vector of the S N-dimensional feature vectors into a respective column of the feature matrix;
generating, based on an interpolation method and at least a part of the S N-dimensional feature vectors, M-S N-dimensional feature vectors;
inserting each N-dimensional feature vector of the M-S N-dimensional feature vectors into a respective column of the feature matrix; and
processing the feature matrix by using a pre-trained convolutional neural network, to obtain a processing result for the object captured in the video stream.

26. The computer-implemented system according to claim 25, wherein the S image frames comprise a first image frame, and wherein extracting the features of the S image frames in the video stream comprises:
determining a change feature of the first image frame based on a comparison between the first image frame and a previous image frame.

27. The computer-implemented system according to claim 26, wherein the S image frames comprise the first image frame, and wherein extracting the features of the S image frames in the video stream further comprises:
using an optical flow change from the previous image frame to the first image frame as the change feature.

28. The computer-implemented system according to claim 26, wherein the S image frames comprise the first image frame, and wherein extracting the features of the S image frames in the video stream further comprises:
determining, as the change feature of the first image frame, a structural similarity index measurement (SSIM) index between the first image frame and the previous image frame that is determined by using a structural similarity model.

29. The computer-implemented system according to claim 26, wherein the S image frames comprise the first image frame, and wherein extracting the features of the S image frames in the video stream further comprises:
determining a projection matrix for converting the previous image frame into the first image frame; and
using the projection matrix as the change feature.

30. The computer-implemented system according to claim 26, wherein the first image frame is the 1st image frame corresponding to the chronological order in the video stream, and wherein the operations further comprise:
determining that the change feature comprises a predetermined value; or
determining that the previous image frame and the first image frame are a same image frame.

* * * * *

UNITED STATES PATENT AND TRADEMARK OFFICE
CERTIFICATE OF CORRECTION

PATENT NO. : 10,943,126 B2  
APPLICATION NO. : 16/703088  
DATED : March 9, 2021  
INVENTOR(S) : Guo et al.

Page 1 of 1

It is certified that error appears in the above-identified patent and that said Letters Patent is hereby corrected as shown below:

In the Claims

Column 20/Line 28, In Claim 11, delete "MS" and insert -- M-S --, therefor.

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*